July 10, 1956
D. A. McLEAN ET AL
2,754,230
METHOD OF MAKING ELECTRICAL CAPACITORS
Filed Oct. 25, 1952
5 Sheets-Sheet 1
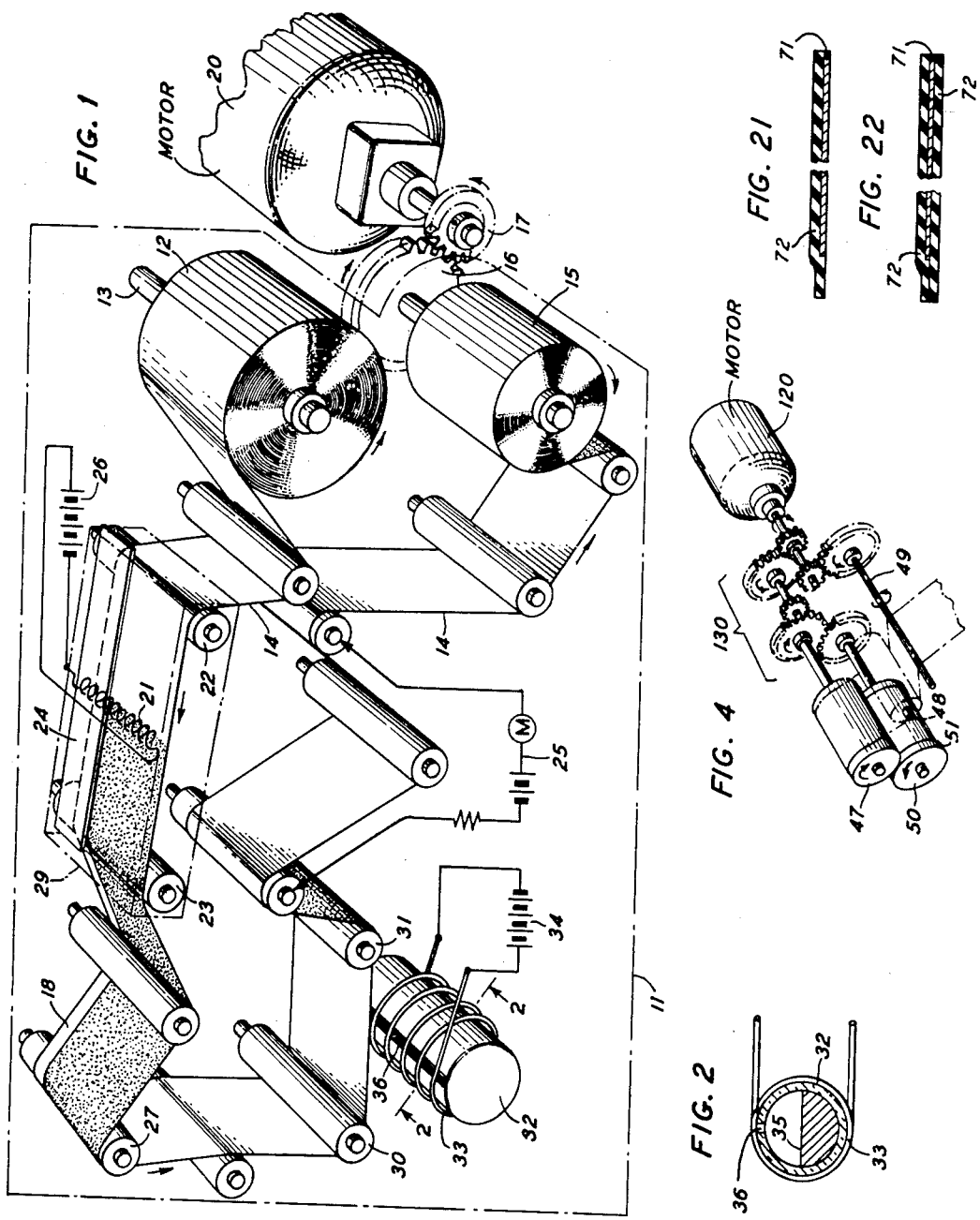
INVENTORS D. A. McLEAN
H. G. WEHE
BY
ATTORNEY July 10, 1956
D. A. McLEAN ET AL
2,754,230
METHOD OF MAKING ELECTRICAL CAPACITORS
Filed Oct. 25, 1952
5 Sheets-Sheet 2
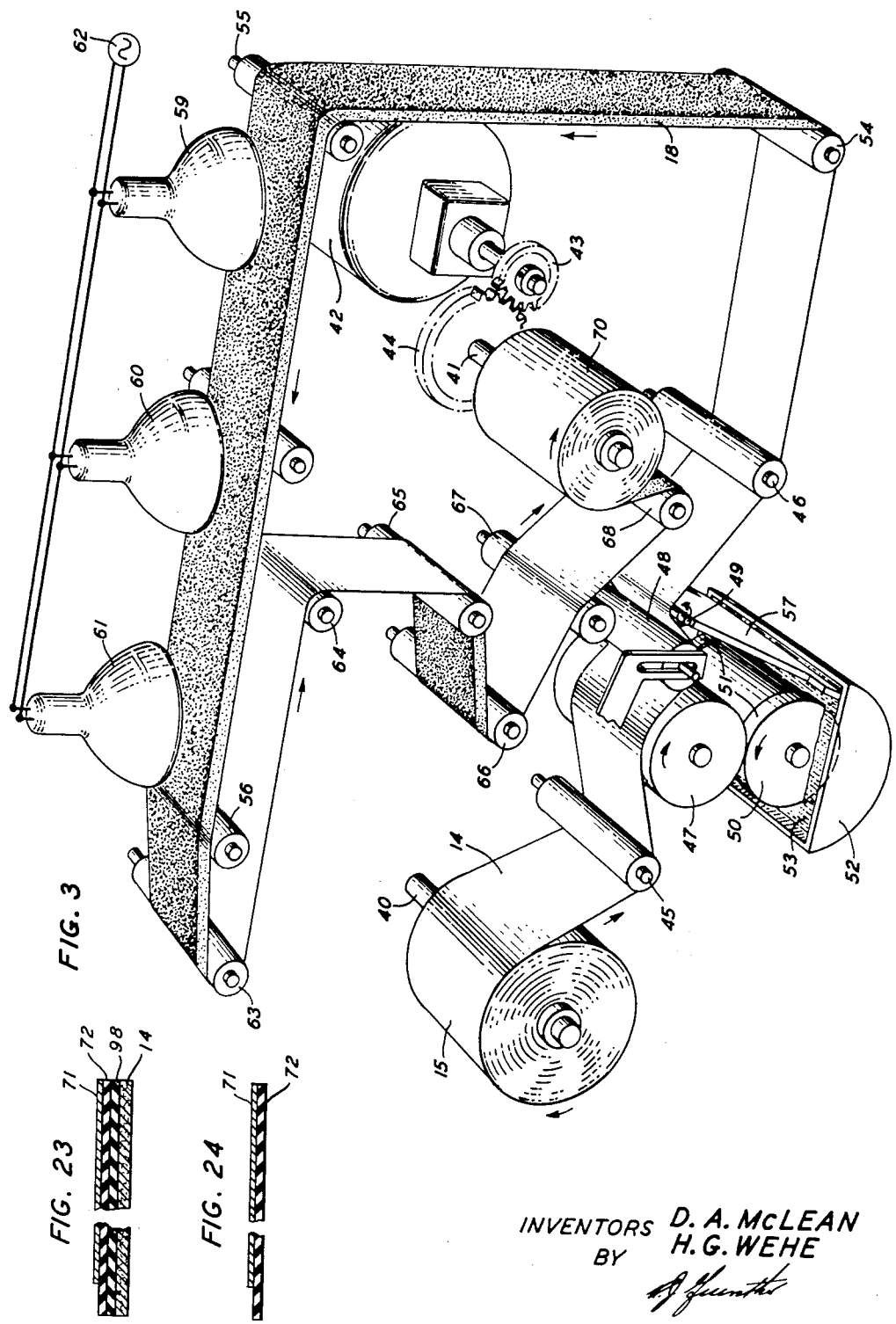
INVENTORS D. A. McLEAN
H. G. WEHE
BY
ATTORNEY July 10, 1956
D. A. McLEAN ET AL
2,754,230
METHOD OF MAKING ELECTRICAL CAPACITORS
Filed Oct. 25, 1952
5 Sheets-Sheet 3
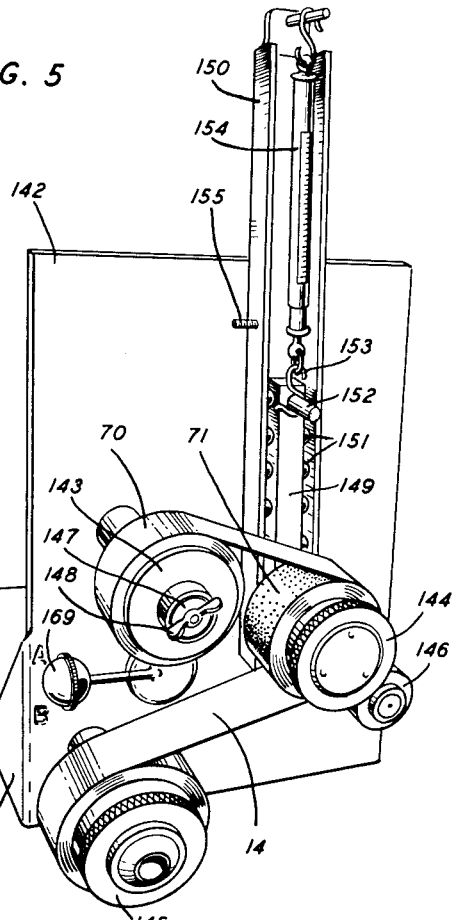
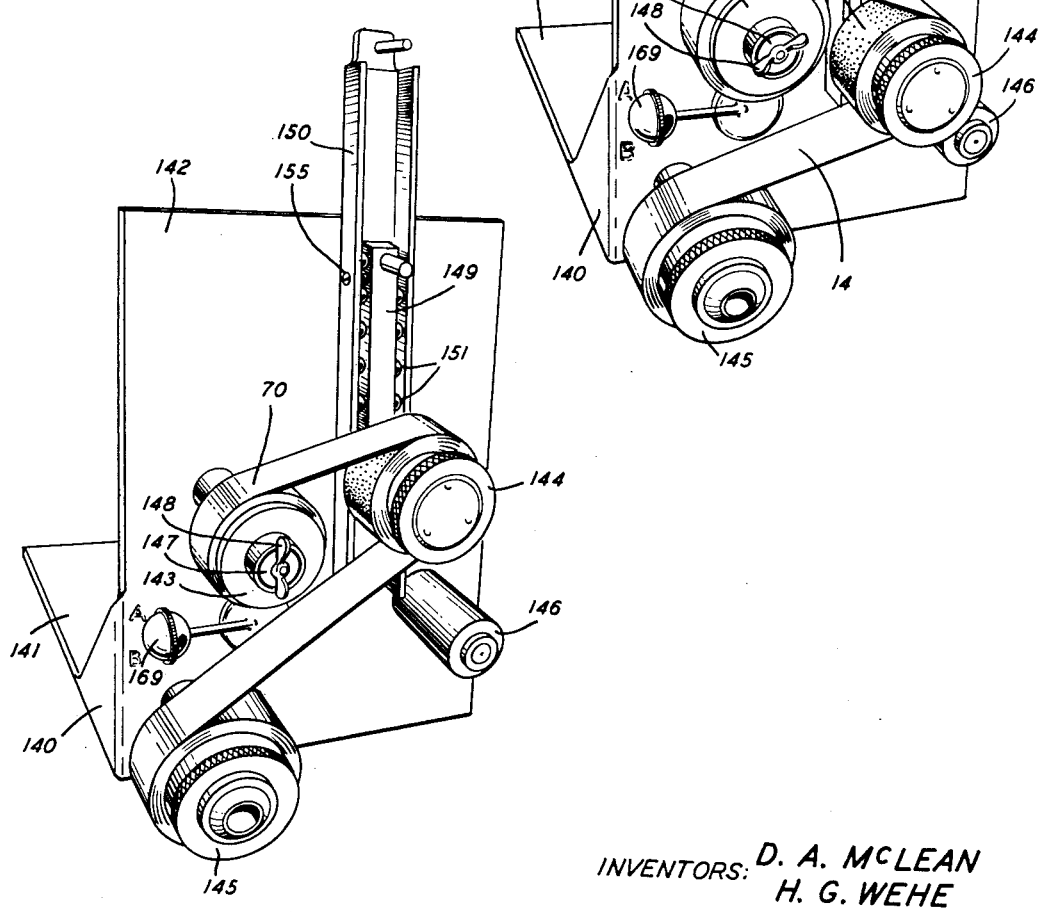
INVENTORS: D. A. McLEAN
H. G. WEHE
BY
ATTORNEY July 10, 1956
D. A. McLEAN ET AL
2,754,230
METHOD OF MAKING ELECTRICAL CAPACITORS
Filed Oct. 25, 1952
5 Sheets-Sheet 4
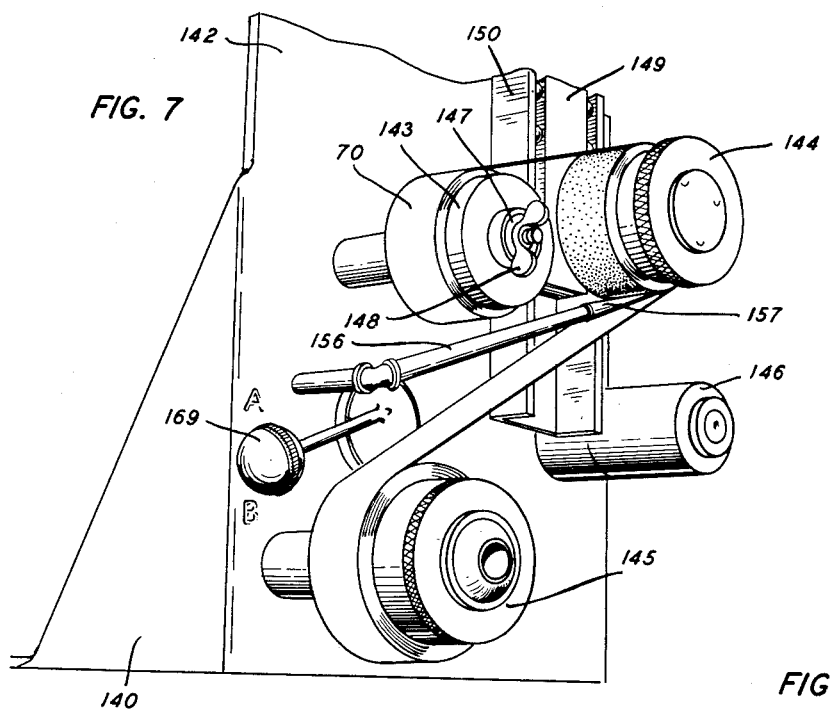
FIG. 7
FIG. 8
FIG. 9
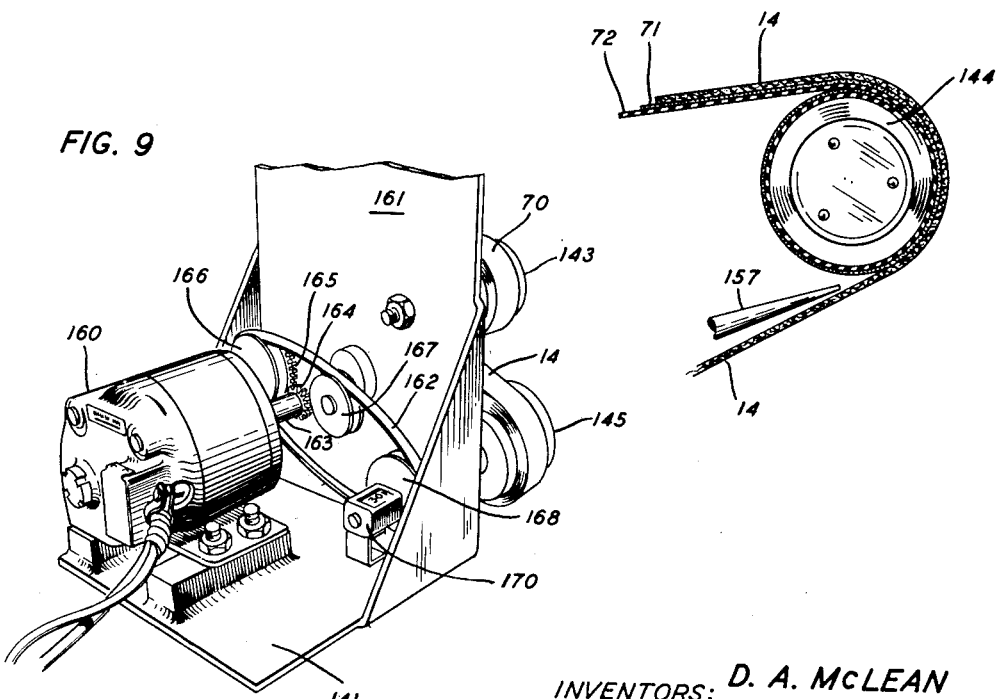
INVENTORS: D. A. McLEAN
H. G. WEHE
BY
ATTORNEY July 10, 1956  D. A. McLEAN ET AL  2,754,230
METHOD OF MAKING ELECTRICAL CAPACITORS
Filed Oct. 25, 1952  5 Sheets-Sheet 5

INVENTORS: D. A. McLEAN
H. G. WEHE
BY

ATTORNEY

United States Patent Office 2,754,230
Patented July 10, 1956

2,754,230
METHOD OF MAKING ELECTRICAL CAPACITORS

David A. McLean, Chatham, and Herman G. Wehe, Summit, N. J., assignors to Bell Telephone Laboratories, Incorporated, New York, N. Y., a corporation of New York Application October 25, 1952, Serial No. 316,928

12 Claims. (Cl. 117—212)

This invention relates to electrical capacitors and methods of making the same and especially of such capacitors wherein the dielectrics are thin films of lacquer and the electrodes are thin films of metal.

This application is a continuation-in-part of the application Serial No. 168,198 filed June 15, 1950, now Patent No. 2,709,663, issued May 31, 1955.

An object of the invention is to provide high quality electrical capacitors of very much smaller volume per unit of capacity than any such (other than electrolytic) hitherto available.

Another object is to provide a method of producing at a rapid rate extended capacitor strips composed of alternating films of lacquer dielectric and metal electrode, appropriate to be rolled up into finished capacitors of any desired capacitance.

The method of the invention comprises, in one aspect and generally speaking, the use of a supporting strip or web upon which the dielectric capacitor strip including a vaporized electrode is built up after which the support strip is removed before capacitors are wound. The use of the support strip throughout the whole process of dielectric film formation and metal evaporation permits the production and handling of very much thinner metallized dielectrics than has heretofore been possible. If the supporting strip is paper, for example, there is first vaporized upon its surface a trace of metal, such as silver, of extreme thinness, upon which is then vaporized, in a film of suitable thickness, the metal electrode. The electrode metal may be zinc, for example, which requires the intermediate silver layer to make it adhere to the paper. It is probable that the zinc and silver layers coalesce into a single layer of zinc-silver alloy so, in the figures and in the following description, the composite metallic layer will be treated as a single layer. Over this composite layer, is deposited a film of lacquer (consisting of a normally solid dielectric material in solution) of desired thickness. Subsequent drying of the dielectric layer results in a capacitor strip suitable for rolling up in conventional manner.

A space saving is accomplished in one embodiment of this invention in which a parting layer of normally solid dielectric is coated upon the supporting strip after which the electrode layer and its dielectric film are formed upon the parting layer instead of on the support strip. After the coating steps are completed, the parting layer is dissolved to separate the lacquer film capacitor from the support strip or the capacitor strip is mechanically separated from support strip resulting in a thin self-supporting capacitor strip.

The thinness of dielectric and the smallness of capacitors for many low voltage usages has been limited by the thickness of the thinnest available self-supporting film which can be produced commercially. The production of metallized paper capacitors has improved this situation by making it possible to use a single layer dielectric. However, it is still true that for the lowest voltage applications, the thinnest commercially available self-supporting dielectric films that can be wound on mandrels, impregnated, and carried through other required manufacturing operations are several times as thick as required for electrical reasons. Since the volume of dielectric required to provide a given capacitance varies as the square of the thickness of the dielectric, it can be seen that this procedure is very uneconomical of space and weight. The present invention overcomes this difficulty by making it possible to adjust the thickness of the dielectric to meet the electrical requirements by employing support strips upon which all operations up to the final capacitor winding, including coating with dielectric film, metallizing, slitting, etc. are effected.

The conducting films used in capacitors produced by the method of this invention may range from 100 to 10,000 angstroms in thickness with the preferred range between 200 and 1,000 angstroms. The dielectric thickness may range from about 0.03 to 0.3 mil resulting in capacitors having but 10 per cent of the volume of metallized paper capacitors of the same capacitance.

An important feature of the present invention is that it makes it possible to take advantage of important characteristics of particular dielectric materials which are either not available in film form or are available only in films too thick to allow them to be used efficiently in capacitors. For example, polystyrene has been used for the dielectric of capacitors; it has desirable characteristics including low "soak" or residual charge, high insulation resistance, low power factor, low temperature coefficient of capacitance, and stability of capacitance with time or service. However, a disadvantage in its use has been that so far it has not been capable of manufacture in self-supporting films thinner than about 0.6 to 1.0 mil. Capacitors built up of alternate layers of metal foils and strips of 0.6 to 1.0 mil polystyrene, or even of such polystyrene strips with metal vaporized thereon, are comparatively bulky. Capacitors in accordance with this invention in which a very thin film of polystyrene is applied to a support strip or web by the roller coating process are very much smaller than any capacitors of the same capacity which are wound or laid up using self-supporting dielectric materials.

Another feature of the invention where the support strip is not removed is that by its use a capacitor can be made with the supporting strip of paper or other supporting structure not forming a part of the electrical components of the capacitor. Consequently, the supporting structure for this form of capacitor can be of material of poor dielectric quality.

Still another feature is that capacitor strips can be built up on a supporting structure, and this supporting structure can be removed, leaving a self-supporting capacitor structure. Such a self-supporting structure is capable of being wound on a mandrel and taken through the usual steps of the processes of manufacture which conventional capacitor paper undergoes in the manufacture of capacitors. This feature is realized by applying a temporary film of lacquer on the supporting structure and building up the capacitor on this lacquer film, after which this lacquer film is dissolved to separate the support from the capacitor, or the support strip is mechanically parted or severed from the capacitor structure. In either chemical or mechanical removal, the temporary layer and the dielectric film should have different solvent systems to facilitate severance of parting layer bonds and to insure against damage to the capacitor strip during the removal operations.

A further feature of this invention involves the production of capacitors of the self-healing type.

Another feature is that this invention permits use of very thin films of dielectric materials, which can be deposited from solution in a form which is thinner, more uniform in thickness and with a more desirable surface than paper can be produced.

A still further feature relates to the production of capacitors which retain very little residual charge.

Also a feature of this invention involves the attainment of a minute capacitor structure having a dielectric thickness commensurate with electrical requirements and which is temporarily supported to withstand the strain of manufacturing operations.

The nature of the present invention will be more fully understood from a consideration of the following detailed description with reference to the accompanying drawings in which:

Fig. 1 is a perspective schematic view of the apparatus for vaporizing metal on a strip of paper;

Fig. 2 is a cross-sectional view of the device for vaporizing metal, which is shown in the lower left-hand portion of Fig. 1;

Fig. 3 is a perspective schematic view of the apparatus for applying from solution a normally solid dielectric material to a strip of paper with a roller and solidifying the resulting film of dielectric material;

Fig. 4 is a perspective view, to a reduced scale, of the motor and gearing for driving the rollers in the apparatus for roller coating capacitor strips shown in Fig. 3;

Fig. 5 is a perspective view of the apparatus for removing the capacitor strip from the paper backing subsequent to vaporization of the metal electrode and roller coating of the dielectric film;

Fig. 6 is a perspective view of the apparatus of Fig. 5 employing a modified mechanical drive for the separation process;

Fig. 7 is a perspective view of the apparatus as shown in Fig. 6 including an air nozzle directed in a manner to assist the separation of the capacitor strip from its support backing;

Fig. 8 is an enlarged fragmentary view of the separation details of the apparatus of Fig. 7;

Fig. 9 is a perspective view of the motor and drive features of the apparatus of Figs. 5, 6 and 7;

Fig. 21 is a magnified cross-sectional view of the capacitor strip of Fig. 19 with the support strip removed;

Fig. 22 is a magnified cross-sectional view of the capacitor strip of Fig. 20 with the support strip removed;

Fig. 23 is a magnified cross-sectional view of a capacitor strip form including a parting layer lying between the support strip and the dielectric film, and the metallized deposit overlying the dielectric film; and Fig. 24 is a magnified cross-sectional view of the capacitor strip of Fig. 23 after the support strip and parting layer have been removed.

Figure 10:
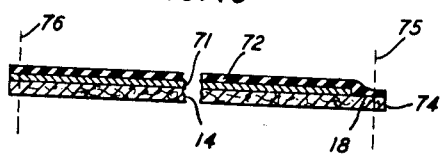
Fig. 10 is a magnified cross-sectional view of a strip of paper on which a composite metal coating has been vaporized in two steps and a film of normally solid dielectric material has been applied from solution by roller coating over the metal coating in accordance with this invention.

Referring now to the drawings, in Fig. 1, the apparatus for vaporizing metal onto a strip of paper is shown encased in a vacuum housing 11. A roll 12 of paper or other suitable supporting material is mounted to rotate on a mandrel 13. The paper strip 14, under uniform tension provided by a brake (not shown), passes over a series of mandrels and, after it is coated with metal, is wound up in a roll 15, driven through a pair of gears 16, 17 by motor 20, preferably outside of the vacuum housing.

A coil of molybdenum wire 21 extends across the face of paper strip 14 between mandrels 22, 23. A mask 24 is mounted to extend between mandrels 22, 23 and over the surface of paper strip 14 for a short distance from one edge thereof, between coil 21 and strip 14. Coil 21 is loaded with silver and is heated by battery 26 to give off silver vapor deposited on the surface of paper strip 14 across the entire face thereof except along the edge 18, where mask 24 prevents the silver vapor reaching the surface of strip 14. The silver deposit thus forms a trace or very thin coating on the strip 14 (except on portion 18 thereof) as the strip moves under coil 21. A housing 29 covers strip 14, coil 21, and mask 24 and extends between mandrels 22 and 23 to confine the silver vapor.

Strip 14 moves onward over mandrel 27, under mandrel 30 to mandrel 31 and over and under other mandrels to reach roll 15. In passing from mandrel 30 to mandrel 31, the under side of paper strip 14 with its silver coating passes horizontally and above zinc vaporizing pot 32, which is surrounded by a wire coil 33 heated by battery 34. Zinc 35 (Fig. 2) is vaporized in pot 32, and vapor from the zinc rises through slot 36 to strike the under side of paper strip 14, where it adheres only to the coating of silver on strip 14 and does not adhere to the edge portion 18 thereof shielded by mask 24. Fig. 2 is a cross-section of pot 32 at the plane 2—2, Fig. 1.

At a convenient point after strip 14 leaves mandrel 31, the electrical resistance of the silver-zinc coating is measured in any suitable manner, say in the circuit 25. The resistance is controlled by varying the speed of travel of strip 14 and the silver and zinc evaporation rates.

Although deposition in vacuum is the preferred method of applying the metal coatings, alternatively one may use the method described in Patent 2,503,571 to H. G. Wehe, granted April 11, 1950, "Apparatus for Coating Surfaces by Thermal Vaporization at Atmospheric Pressure."

After strip forming roll 15 has received the silver-zinc coating throughout its length, it is transferred to the lacquer coating apparatus of Fig. 3, where it is mounted on mandrel 40. Strip 14, under uniform tension provided by a light brake (not shown) is threaded under and over a series of mandrels to takeup mandrel 41 driven by motor 42 through gears 43, 44. Between mandrels 45 and 46, strip 14 passes over roller 47, of axial length somewhat greater than the width of the strip, under a bobbin 48 and over scraper roller 49. The metal coated side of strip 14 is in contact with roller 47 which itself bears upon the end portions of roller 50. Between these portions, roller 50 is undercut to a uniform diameter slightly less than that of the end portions, which themselves are of the same diameter as roller 47.

Rollers 47 and 50 are driven together, by a motor and gearing as shown in Fig. 4, to revolve in opposite senses, as shown. Below roller 50 is supported tray 52 containing a solution 53 of normally solid dielectric material. A suitable solution is that of cellulose acetate butyrate in methyl acetate. The surface of roller 50 picks up from tray 52 a portion of solution 53 which it applies to the surface of roller 47 within the limits of the undercut portion of roller 50. The solution thus applied to roller 47 is thereupon applied as a coating over nearly the entire width of strip 14, including the shielded strip 18, leaving a narrow margin at each edge of strip 14 to avoid bead formation.

Scraper roller 49, driven by a motor shown in Fig. 4, revolves in a groove in drain board 57 in a sense opposite to the direction of travel of strip 14. Thus, excess solution is removed from the strip and carried off by board 57 to return to tray 52. Contact between strip 14 and roller 47 is made uniform across the width of the strip by the weight of bobbin 48.

The paper strip 14 with the coating of dissolved dielectric material passes over mandrels 54, 55, 56. During this travel some of the solvent is lost to the surrounding air. Between mandrel 55 and mandrel 56, strip 14 passes below a plurality of heating lamps 59, 60, 61, which may for example be of the infra-red type, heated from a power source 62. Metal heat reflectors may be advantageously employed adjacent the strip 14 to confine the heat. In passing between mandrels 55 and 56 paper strip 14 has the coating of dielectric material exposed to the rays of lamps 59, 60, 61 which substantially complete the removal of solvent, leaving the layer of solid dielectric material. Paper strip 14 then travels around other mandrels 63, 64, 65, 66, 67, 68 and is wound up in a roll 70.

Fig. 4 is a schematic showing, in greater detail than Fig. 3, of the driving mechanism controlling the application of the lacquer coating. Motor 120, through gearing generally designated 130, drives in the rotational senses indicated, the rollers 47 and 50 and scraper roller 49.

In Fig. 5 may be seen an apparatus for mechanically stripping the paper backing from the metal coated lacquer film to obtain the greatest space saving. The apparatus comprises a frame 140 comprising a platform 141 and a vertical plate 142. The frame 140 is adapted to position a motor 160 and a drive assembly 161 best seen in Fig. 9. The vertical plate 142 supports the stripping apparatus which comprises a supply drum 143, capacitor strip takeup drum 144, paper takeup drum 145 and driver wheel 146 all rotatably mounted. The supply drum 143 holds a roll 70 of capacitor strip including the paper backing 14. A friction brake 147, adjustable by wingnut 148, is located within the supply drum 143. The capacitator strip takeup drum 144 is attached rotatably to an arm 149 which is mounted for facile vertical movement in channel or guide 150 on ball bearings 151. The arm 149 is supported by a stud 152 resting in a hook 153 of spring balance 154 attached to the channel 150. In the position shown in Fig. 5 the capacitor strip takeup drum 144 on arm 149 rests upon driver wheel 146 which is geared to motor 160 shown in Fig. 9. A lever 169 controlling an idler pulley 167 of the drive assembly 161 is mounted upon plate 142 between the supply drum 143 and the paper takeup drum 145.

The paper takeup drum 145 is rotatably mounted upon vertical plate 142 to be driven from the rear of plate 142. In operation the roll 70 on supply drum 143 may be the paper backed capacitor strips as shown in Figs. 10, 15, 18, 19, 20 or 23. The roll 70 with the paper side uppermost is threaded over the capacitor strip takeup drum 144 when it is in a raised position and the stripping begun manually as by making a knife cut which penetrates the dielectric and electrode layers but not the paper back and peeling back a portion of the paper. By carefully stripping a sufficient amount of the paper backing to reach the paper takeup drum 145 and to be affixed thereto and by lightly winding the capacitor strip on the capacitor takeup drum the mechanical stripping may be commenced. Care in the initial manual stripping of the paper is recommended because of the fragility of the minute capacitor strip. When the ends are attached to their respective drums, as by a cement, the capacitor strip takeup drum 144 may be lowered until it rests upon the driver wheel 146, the motor energized and the lever 169 moved to a position nearly midway between the positions marked A and B to commence the stripping operation.

The speed control is accomplished by the use of a controlled amount of slippage in the drive of paper takeup drum 145. A difference in the diameter of the paper takeup drum 145 and the driver wheel 146 results in greater tension in the paper than on the capacitor strip at all times and slippage in belt 162 will reduce the tension differential. Tension adjustment is made while the stripping is progressing by moving the lever 169 from a midpoint toward the position marked A if a greater tension differential is required, or toward B if an opposite condition exists. This method allows an accurate control of the relative amount of tension on the layers.

The speed of stripping varies with the individual surface and boundary conditions of the tape and is varied by controlling the speed of motor 160 or by adjusting the wingnut 148 which introduces a tension in the strip and a vertical component of force tending to raise the capacitor takeup drum 144. In a particular apparatus employed in accordance with this invention, the best results were obtained when a spring balance reading of approximately 6 pounds was maintained.

The apparatus of Fig. 5 may be operated in another manner to accomplish the same step of stripping of the capacitor film. Fig. 6 is illustrative of this other method for in this embodiment the arm 149 and capacitor strip takeup drum 144 are raised off of the driver wheel 146 and only the paper takeup drum 145 is driven. The arm 149 is secured by the lock screw 155 in the channel 150. The tension in the strip is again adjusted by the wingnut 148 on friction brake 147. This method of separation involves a drive arrangement which has given very satisfactory results in rapid stripping with a negligible amount of tearing of the capacitor film.

To improve the separation process it has been found advisable to add an air pipe 156 having a blade-like nozzle 157 to the apparatus of Figs. 5 and 6 as shown in Fig. 7 and the magnified view Fig. 8. The nozzle 157 is directed toward the capacitor strip takeup drum 144 at the point where the separation takes place. A knife-like stream of air from the nozzle 157 literally severs the bond of the lacquer or metal layer to the support strip. In the capacitor strip forms of Figs. 19 and 20 which include a parting layer, the operation is successful either with or without the use of the air stream.

By reference now to Fig. 9 may be seen a view of the mechanical drive components of the apparatus. They include the motor 160 mounted upon platform 141 of frame 140. The shaft 163 of motor 160 is mechanically engaged to the driver wheel 146 through gears 164 and 165. The driven gear 165 is journaled to the same shaft as the driver wheel 146. Attached to the driven gear 165 is a driver wheel pulley 166 in which rides a belt 162. The belt 162 rides over idler pulley 167 and takeup pulley 168 which is coupled to the paper takeup drum 145. By movement of lever 169 to the position marked A, the slack in the belt 162 may be reduced thus increasing the speed of the paper takeup drum 145. To give an indication of the length of the capacitor strip wound a revolution counter 170 engages the pulley 168.

Figure 11:
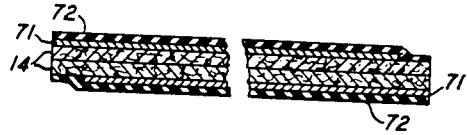
Fig. 11 is a magnified cross-sectional view showing two strips, such as shown in Fig. 10, placed back to back ready for rolling up into cylindrical form after their edges have been trimmed.
Figure 12:
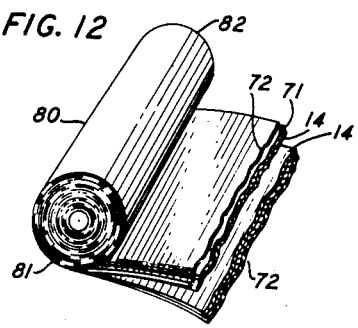
Fig. 12 is a magnified perspective view showing the two strips of Fig. 11 in the process of being rolled up to form a cylindrical capacitor.
Figure 13:
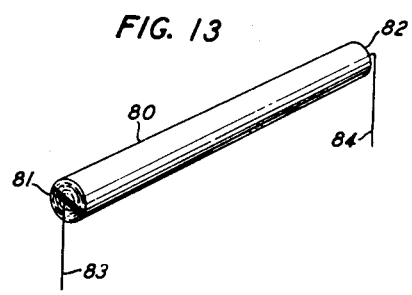
Fig. 13 is a perspective view of a completed capacitor, such as shown in Fig. 12, after the ends of the cylinder have been Schooped or sprayed and terminal wires have been attached to the Schooped or sprayed ends.

The coated paper strip 14, after the drying and hardening of the coating of dielectric material on it, has a cross-section as shown in Fig. 10 in which the silver-zinc coating 71 is above the surface of paper strip 14, and the dielectric material coating 72 is on top of coating 71 and also extends to edge 74 of paper strip 14 adjacent the unmetallized portion 18. Fig. 10 is a magnified view of the coated paper strip 14 and, as hereinbefore mentioned, the metallized coating 71 and dielectric film 72 are of extreme thinness.

Where capacitor space requirements are not critical, or where the metallized lacquer film having special electrical properties such as low residual charge is too fragile to handle alone, the removal of the paper backing is not required before the capacitor is rolled. In such a case after a roll 70 of coated paper strip 14 has been completed, it is rerolled in a trimming operation which slices off the edges of strip 14 at 75, 76. This trimming at 76 produces a clean exposure of silver-zinc coating 71. Two of such coated and trimmed paper strips are then rolled up together with the uncoated surfaces of the strips in contact with each other as shown in magnified cross-section in Fig. 11. This exposes a clean edge of the metal coating of the upper of the coated paper strips 14 at one end of the lay-up and a clean edge of the metal coating of the lower of the coated paper strips 14 at the other end. The two coated paper strips 14 which are thus laid up back to back are rolled up into a cylinder 80 as shown in Fig. 12. Metal is then Schooped onto the ends 81, 82 of cylinder 80 to form a contact with the ends of the zinc coatings to which connecting wires 83, 84 can be attached as shown in Fig. 13.

Figure 14:
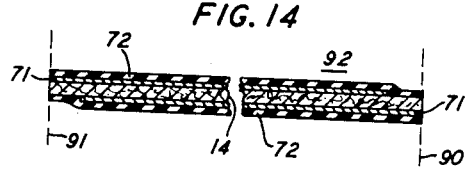
Fig. 14 is a magnified cross-sectional view of a capacitor strip with coatings such as shown in Fig. 10 applied first on one side of a paper strip and then on the reverse side.

Another form of capacitor embodying this invention is shown in magnified cross-section in Fig. 14. To produce capacitors using this form of capacitor strip, the coating method described above which results in the product of Fig. 10 is used for vaporizing a coating of silver on one side of paper strip 14 with the coating of zinc vaporized onto the coating of silver. The paper strip is then metallized on the reverse side leaving the uncoated margin at the opposite edge of the strip. The metallized paper is then lacquered first on one side, and then on the other by the roller coating process described. The paper strip is then trimmed at edges 90, 91 to form the capacitor strip shown in cross-section in Fig. 14. This capacitor strip is then rolled up, metal terminals are Schooped on and terminal wires are attached to produce the finished product.

Figure 15:
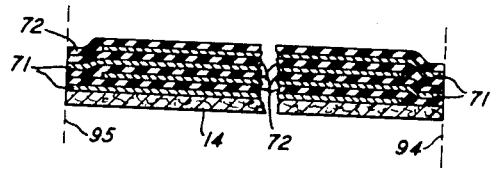
Fig. 15 is a magnified cross-sectional view of a capacitor strip composed of successive alternate layers of vaporized metal coatings and films of dielectric material on a single strip of paper.

Still another form of capacitor in accordance with this invention is shown in Fig. 15. Paper strip 14 is given a first coating of silver, zinc and dielectric material as described above in connection with Fig. 10. Roll 70 of Fig. 3 is then rerolled into another spool in order that the edge of the paper strip to which the zinc coating does not extend will be placed in position on mandrel 13 so that this edge of the paper strip will pass under mask 24. The coated strip can then again be taken through the steps of the coating processes with the apparatus of Fig. 1 and Fig. 3 in the manner that the product will have the metal of the first coating extending only to one edge of the paper strip and the metal coating which is applied on top of the first coatings by the second use of the apparatus of Fig. 1 and Fig. 3 will extend only to the other edge of the paper strip. After the roll of paper strip has been passed through the second processing by means of the apparatus of Fig. 1 and Fig. 3 it is again rerolled to reverse the position of the edge of the strip to which the upper metal coating extends. This roll is then ready for a third run through the apparatus of Fig. 1 and Fig. 3 in order to place third coatings of silver, zinc and dielectric material on the strip. Following this, successively, other coatings of silver, zinc and dielectric material are applied in like manner to build up a capacitor structure as shown in Fig. 15, of the desired number of coatings. The edges 94, 95 are then slit off or trimmed to expose a clean edge of the zinc coatings. Fig. 15 shows two metal coatings appearing at each edge of paper strip 14. The coatings of silver, zinc and dielectric material are very thin films and a strip of paper thus coated can be rolled up and metal ends Schooped on, to which terminal wire connections can be made. The sequence of operations described may be repeated as often as desired.

Figure 16:
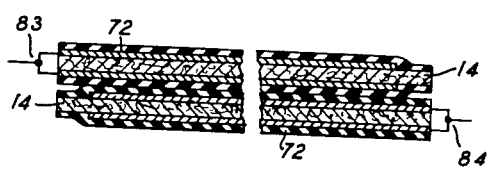
Fig. 16 is a magnified cross-sectional view of two capacitor strips laid back to back, each strip having vaporized metal and lacquer roller coated on both sides of the supporting strip but with the vaporized metal coatings on both sides extending to the same edge.

Yet another embodiment is shown in Fig. 16 in which two similar capacitor strips are placed together but with their like edges at opposite sides of the lay-up. Each of the two capacitor strips has a paper strip 14 with vaporized metal coatings applied thereon and roller coated layers of dielectric material over each of the vaporized coatings and extending from edge to edge of strips 14. These capacitor strips are then trimmed along the edges, rolled up into a cylinder, metal is Schooped on the cylinder ends and connecting wires 83 and 84 soldered to the Schooped ends to make a completed capacitor.

Figure 17:
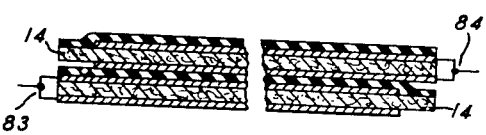
Fig. 17 is a magnified cross-sectional view of two capacitor strips laid back to back for forming a capacitor, each strip having a vaporized metal coating on both sides of the supporting strip and with the vaporized metal coatings on both sides extending to the same edge of the supporting strip but with roller coated lacquer on only one of these metal coatings.

The paper strips in the capacitor of Fig. 16 are excluded from the electrical path, because each strip is embraced by two similarly extended metal coatings which are conductively connected to form one electrode of the finished capacitor. An alternative arrangement is shown in Fig. 17. Here two capacitor strips are laid together ready for rolling up into a capacitor in which the supporting paper strips form no part of the electrical path in the finished capacitor and consequently the electrical quality of the paper strips does not influence that of the capacitor which is entirely dependent upon the properties of the lacquer film. The two strips each have vaporized metal coatings on the two surfaces of each paper strip 14, and there is a coating of dielectric material over one of the metal coatings on each strip. After rolling the two strips into the form of a cylinder, metal is Schooped onto the ends of the exposed edges of the metal coatings to which connecting wires 83 and 84 are soldered. Of the adjoined strips, one external surface is lacquer, the other metal.

In the capacitors of Figs. 16 and 17, the electrical properties are likewise completely determined by those of the roller coated dielectric material and are practically independent of the electrical character of the paper support which in these embodiments is not removed. The supporting strip in these forms of capacitor may therefore be of any insulating material of sufficient flexibility and tensile strength, a plastic strip for example. The arrangement of metallic coatings, on both faces of the support, electrically joined at one edge to constitute one electrode, the other electrode being similarly constituted, leaves the intermediate strips of paper or other insulating material to serve as a framework only, in which practically no dielectric losses occur. Obviously, one may provide on each face of the supporting strip any convenient number of metallic coatings with appropriate lacquer coatings, joining at one edge all the metallic coatings to form a single electrode of the final capacitor. In these forms (Figs. 16 and 17) using polystyrene as the coating and paper as the supporting layer, capacitors have been made which have but 15 per cent of the volume for the same capacitance of polystyrene insulated capacitors made with available commercial self-supporting dielectric films. This feature permits the excellent dielectric properties of polystyrene to be used in very small capacitors, something which has not been possible heretofore.

Figure 18:
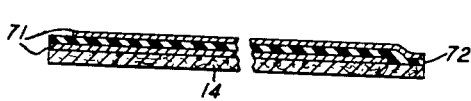
Fig. 18 is a magnified cross-sectional view of a capacitor strip with a vaporized metal coating on the supporting strip, lacquer roller coated over the metal coating, and a second vaporized metal coating over the lacquer coating.

Still another embodiment is shown in cross-sectional view in Fig. 18. In this capacitor strip the coatings are all on one side of paper strip 14. A metal coating 71 is first vaporized on one side of paper strip 14 extending to one edge. A coating of dielectric material 72 is then roller coated on over the metal coating 71 and extends from edge to edge of paper strip 14. A second metal coating 71 is vaporized on over the coating of dielectric material 72 extending to the opposite edge. The finished strip is trimmed, rolled up into cylindrical form, metal is Schooped onto the cylinder ends and connecting wires are soldered to the Schooped metal ends to make a completed capacitor.

Extremely minute capacitors result from this invention wherein the paper strip 14 or supporting strip is separated from the capacitor structure after the capacitor structure has been built up on it. This is done by first applying a coating of a liquefied normally solid dielectric material to the entire bare surface of one side of paper strip 14 as the first step in the process. If polystyrene is used as the parting layer it constitutes the first coating of paper strip 14, which is then coated with zinc and silver and another coating of cellulose acetate, or by cellulose acetate followed by silver and zinc. When cellulose acetate is used as the liquefied normally solid dielectric material for the film which will support the zinc coating, it is possible to dissolve the coating of polystyrene with benzene and thus remove the paper strip from the silver, zinc and cellulose acetate coatings. The resulting product from the first-mentioned order of deposit will be a strip made up of coatings as in Fig. 19 which shows the metal coating 71 and cellulose acetate dielectric coating 72 before the polystyrene coating 98 is dissolved by benzene to separate paper strip 14 from its coatings. When the latter order of deposit is used, a strip as is shown in Fig. 23 results. It comprises a support strip 14 coated over one side with a parting layer 98 over which the dielectric film 72 and metallized electrode 71 are deposited in that order.

Figure 20:
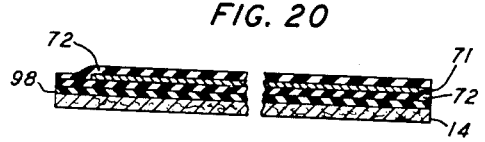
Fig. 20 is a magnified cross-sectional view of a capacitor strip with a soluble coating on the supporting strip, roller coated lacquer over the soluble coating, a vaporized metal coating over the lacquer coating and a roller coated lacquer coating over the metal coating.

Mechanical separation without resort to dissolving the parting layer is accomplished with the apparatus of Figs. 5 through 9. Though both chemical and mechanical separation are successful, it has been found that the mechanical method of separation is more easily adapted to continuous manufacturing methods. Positive stripping may be insured in the mechanical method by employing two dielectric layers between the support strip and the electrode layer such as in Figs. 20 and 23, where the two dielectric layers have different solvent systems. When the layers have different solvent systems they will, although adjacent each other, remain distinct and be only lightly bonded together forming a natural cleavage for separation. Fig. 20 support strip 14 is covered on one side with a coating 98 of a dielectric such as polystyrene which has a benzene solvent system. The second dielectric layer 72 is of cellulose acetate or other readily soluble dielectric having a methyl acetate solvent system, or methylene chloride-ethylene dichloride-ethanol system, or cyclo-hexanone-acetone system. The light bond results from the fact that these latter solvents do not attack the underlying polystyrene. The electrode 71 is vaporized over the dielectric layer 72 and a second dielectric layer 72 is roller coated over the electrode 71. The support strip backed capacitor strip is in a form ready for separation employing the apparatus of Figs. 5 through 9.

Figure 19:
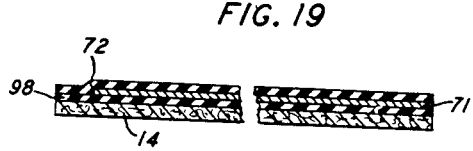
Fig. 19 is a magnified cross-sectional view of a capacitor strip with a soluble coating on the supporting strip, a vaporized metal coating on the soluble coating, and roller coated lacquer over the metal coating.

The capacitor strips of Figs. 19, 20 and 23 after removal of the support strip and ready for capacitor rolling in the manner previously described are shown in Figs. 21, 22 and 24, respectively. Each of these forms includes a self-supporting dielectric layer 72 having an electrode layer 71 on one side. In Fig. 22 the electrode layer 71 is embraced by dielectric layers or films 72.

There have been described the manufacture of three forms of capacitor strips which may be rolled up to form a finished capacitor, of capacitance determined by the length of the strip thickness and by the number of alternate layers of conducting and insulating coatings. In one form the alternating conducting and insulating coatings are supported by a strip of paper on other material; the second form is that in which the supporting material is excluded from the electrical circuit; and the third form, the thin dielectric film after removal of the support strip, forms with the deposited electrode layer a self-supporting capacitor strip.

It will be understood that in the utilization of this invention, in place of zinc any metal of low electrical resistivity, chemically stable and able to withstand the heat of the drying lamps and the expected ambient temperature during use, may be used for the electrodes. Examples of suitable lacquers are cellulose acetate, cellulose nitrate, high acetyl cellulose acetate, polystyrene and cellulose acetate butyrate. While reference has been repeatedly made to paper as the support strip material, it will be understood that several organic polymeric substances are suitable, as well as coated paper. The use of such polymeric materials has the advantage of not requiring the parting layer coating as is often necessary when employing uncoated paper backing. In the cases where the support strip will be removed before the capacitor is wound, metal foil may be used to provide sufficient strength to withstand manufacturing operations and to provide a readily separated support strip when the metallized dielectric film is ready for capacitor rolling.

It is to be understood that the above-described arrangements are illustrative of the application of the principles of the invention. Numerous other arrangements may be devised by those skilled in the art without departing from the spirit and scope of the invention.

What is claimed is:

1. The method of making metallized lacquer film capacitor strips including vaporizing a trace of silver upon an area of a support strip, vaporizing a layer of low resistivity, chemically stable metal having the property of substantially greater adherence to silver than to the material of said support strip, on said trace of silver, applying a liquid coating of dielectric lacquer over the conducting layer, and evaporating to dryness the liquid coating.

2. The method of making metallized lacquer film capacitor strips including vaporizing a trace of silver over one side of a supporting strip except over a margin at one edge thereof, vaporizing a conducting coating of zinc over said trace of silver applying over the conducting coating and margin a liquid coating consisting of a dielectric lacquer, evaporating to dryness the liquid coating, vaporizing a second trace of silver over the other side of the strip except for a margin at the same edge thereof, vaporizing a conducting coating of zinc over said second trace of silver applying over the second conducting coating and the corresponding margin a second liquid coating of dielectric lacquer, evaporating to dryness the second liquid coating, and electrically connecting the conducting coatings at the other edge of the strip.

3. The method of making metallized lacquer film capacitor strips including the steps of coating one side of a supporting strip with a first coating of dielectric lacquer, evaporating the first dielectric coating to dryness, vaporizing a trace of silver over the dried first coating except over a margin at one edge of the strip, vaporizing a conducting coating of zinc over said trace of silver, applying over the conducting coating and the margin a second coating of dielectric lacquer, evaporating the second dielectric coating to dryness, and removing the support strip.

4. The method of making electrical capacitor strips in accordance with claim 3 wherein the second dielectric coating has a different solvent system from the first dielectric layer and the supporting strip is removed by dissolving the first dielectric coating.

5. The method of making metallized lacquer film capacitor strips including applying a first coating of dielectric lacquer to a support strip, evaporating the first coating to dryness, applying a second coating of dielectric lacquer having a different solvent system from said first coating over said first coating, evaporating the second coating to dryness, vaporizing a trace of silver on a portion of said second coating, vaporizing about said support strip a coating of chemically stable conducting material having the property of substantially greater adherence to silver than to said support strip and said first and second coatings of dielectric lacquer, and removing the support strip and first coating of dielectric material.

6. The method in accordance with claim 5 wherein the support strip and first dielectric coating are removed by dissolving the first dielectric coating in a solvent unaffecting the second dielectric coating.

7. The method in accordance with claim 5 wherein the support strip and first dielectric coating are removed by passing the coated strip over a drum and stripping the first dielectric coating and support strip from the vaporized layers and second dielectric coating while winding the vaporized layers and second dielectric coating upon said drum.

8. The method in accordance with claim 7 wherein a stream of air is directed toward the first and second dielectric coatings at their point of separation.

9. The method of making lacquer dielectric electrical capacitor strips comprising vaporizing a trace of silver upon a limited area of the surface of a flexible support strip, passing the entire area of the support strip through vapors of a low resistivity, chemically stable metal having the properties of readily adhering to said trace of silver and substantially nonadherence to the material of said flexible support strip, and applying a dielectric coating over the resulting metallic layer.

10. The method of making lacquer dielectric capacitor strips comprising vaporizing a trace of silver upon one surface of a flexible support strip except for a margin at one edge, passing the entire surface of the support strip through vapors of a low resistivity, chemically stable metal having the property of readily adhering to said trace of silver and substantially nonadherence to the material of said flexible support strip thereby forming a conducting layer upon said support strip, and applying a coating of dielectric lacquer over said conducting layer and margin of said support strip.

11. The method of making self-supportable lacquer dielectric capacitor strips comprising applying a liquid coating of dielectric lacquer to a surface of a flexible support strip, evaporating the coating to dryness, applying a film of dielectric lacquer having a different solvent system from said first coating over said first coating, vaporizing a trace of silver over a limited area of said film of dielectric lacquer, passing the coated support strip through vapors of a low resistivity, chemically stable metal having the property of readily adhering to said trace of silver and substantially nonadherence to the material of said flexible support strip and said first and second coatings of dielectric lacquer thereby forming a conducting layer upon the area of said film, and separating said film and conducting layer from the support strip by dissolving the first coating of dielectric lacquer.

12. The method in accordance with claim 11 wherein said first coating of dielectric lacquer is of polystyrene and the film of dielectric lacquer is cellulose acetate and the film and conducting layer is separated from the support strip by dissolving the polystyrene in a solvent of the benzene system.

References Cited in the file of this patent

UNITED STATES PATENTS

| | | |
|---|---|---|
| 1,784,611 | Polanyi et al. | Dec. 9, 1930 |
| 2,399,313 | Ballard | Apr. 30, 1946 |
| 2,702,760 | Barth | Feb. 22, 1955 |